(12) United States Patent
Gu et al.

(10) Patent No.: US 12,260,353 B2
(45) Date of Patent: Mar. 25, 2025

(54) RESERVATION METHOD AND RESERVATION APPARATUS FOR ELECTRONIC DEVICE

(71) Applicant: GREE ELECTRIC APPLIANCES, INC. OF ZHUHAI, Guangdong (CN)

(72) Inventors: Jianfeng Gu, Guangdong (CN); Ling Feng, Guangdong (CN); Shuo Li, Guangdong (CN)

(73) Assignee: GREE ELECTRIC APPLIANCES, INC. OF ZHUHAI (CN)

(*) Notice: Subject to any disclaimer, the term of this patent is extended or adjusted under 35 U.S.C. 154(b) by 723 days.

(21) Appl. No.: 17/272,154

(22) PCT Filed: Jan. 28, 2019

(86) PCT No.: PCT/CN2019/073430
§ 371 (c)(1),
(2) Date: Feb. 26, 2021

(87) PCT Pub. No.: WO2020/042540
PCT Pub. Date: Mar. 5, 2020

(65) Prior Publication Data
US 2021/0192400 A1 Jun. 24, 2021

(30) Foreign Application Priority Data
Aug. 27, 2018 (CN) .......................... 201810980379.5

(51) Int. Cl.
*G06Q 10/02* (2012.01)
*G04F 10/00* (2006.01)
*G05B 19/4155* (2006.01)

(52) U.S. Cl.
CPC ............. *G06Q 10/02* (2013.01); *G04F 10/00* (2013.01); *G05B 19/4155* (2013.01); *G05B 2219/25256* (2013.01)

(58) Field of Classification Search
None
See application file for complete search history.

(56) References Cited

U.S. PATENT DOCUMENTS

2009/0028006 A1* 1/2009 Ha ........................... G06F 1/14
368/46
2014/0301261 A1 10/2014 Godor et al.
2016/0157317 A1 6/2016 Ivey et al.

FOREIGN PATENT DOCUMENTS

CN 203219316 U 9/2013
CN 104125263 A 10/2014
(Continued)

OTHER PUBLICATIONS

Comartin, "In-Memory Caching with Foundatio", Sep. 2016, CodeOpinion, pp. 1 (Year: 2016).*
(Continued)

*Primary Examiner* — David Earl Ogg
(74) *Attorney, Agent, or Firm* — Perkins Coie LLP

(57) ABSTRACT

The disclosure discloses a reservation method and apparatus for an electronic device for improving reservation accuracy, wherein the reservation method includes: receiving a reservation instruction sent by a terminal device, wherein the reservation instruction carries identification information, an operation content, and an execution time of the electronic device; obtaining a current time from a clock source and starts timing, and obtaining a target reference time, wherein the clock source is a clock source of the terminal device, a network device, or the reservation apparatus, and the target reference time is configured to indicate the time after timing; and if determining that a difference value between the target reference time and the execution time is less than values within a preset range, controlling the electronic device to execute the reservation instruction.

20 Claims, 2 Drawing Sheets

(56) References Cited

FOREIGN PATENT DOCUMENTS

| | | | |
|---|---|---|---|
| CN | 104379827 A | | 2/2015 |
| CN | 104678851 A | | 6/2015 |
| CN | 105095004 A | * | 11/2015 |
| CN | 105843053 A | | 8/2016 |
| CN | 106016448 A | | 10/2016 |
| CN | 107990488 A | | 5/2018 |
| CN | 107995260 A | | 5/2018 |
| CN | 108234052 A | | 6/2018 |
| CN | 108255076 A | | 7/2018 |
| CN | 108402879 A | | 8/2018 |
| CN | 109164694 A | | 1/2019 |
| JP | H1118934 | * | 7/1997 |
| JP | 2003116183 A | * | 4/2003 |
| JP | 2012147593 A | * | 8/2012 |
| WO | WO-2018003266 A1 | * | 1/2018 .............. A47J 27/00 |

OTHER PUBLICATIONS

International Search Report and Written Opinion mailed on Apr. 23, 2019 for International Application No. PCT/CN2019/073430 filed on Jan. 28, 2019 (with translation) (17 pages).
First Search Report and Office Action of Chinese Patent Application CN201810980379 (with translation) (16 pages).

* cited by examiner

RESERVATION METHOD AND RESERVATION APPARATUS FOR ELECTRONIC DEVICE

CROSS-REFERENCE TO RELATED APPLICATION

The present application is a U.S. National Phase Entry of International PCT Application No. PCT/CN2019/073430 filed on Jan. 28, 2019, and entitled "RESERVATION METHOD AND RESERVATION APPARATUS FOR ELECTRONIC DEVICE," which is based upon and claims priority to CN application No. 201810908497.5, filed Aug. 27, 2018, the entire contents of which are incorporated herein by reference in their entirety.

TECHNICAL FIELD

The present disclosure relates to the field of electronic device technologies, and more particularly, to a reservation method and apparatus for an electronic device.

BACKGROUND

At present, an electronic device, such as an air conditioner, a rice cooker, or the like, realizes a reservation function by counting down through a timer. This method is mainly realized by the timer of the electronic device. However, if the accuracy of the timer is not high enough, the electronic device may have a large error when reaching scheduled time after long-term operation.

SUMMARY

According to a first aspect, an embodiment of the present disclosure provides a reservation method for an electronic device applied to a reservation apparatus, wherein the reservation method includes:
  receiving a reservation instruction sent by a terminal device, wherein the reservation instruction carries identification information, an operation content and an execution time of the electronic device;
  obtaining a current time from a clock source and starting timing, and obtaining a target reference time, wherein the clock source is a clock source inside the terminal device, a network device, or the reservation apparatus, and the target reference time is configured to indicate the time after timing; and
  if determining that a difference value between the target reference time and the execution time is less than values in a preset range, controlling the electronic device to execute the reservation instruction.

In some embodiments, the clock source is a clock source inside the electronic device.

In some embodiments, after the receiving the reservation instruction sent by the terminal device, the reservation method further includes:
  determining whether the electronic device or the reservation apparatus stores reservation information; and
  if determining that the electronic device stores the reservation information, sending a deletion instruction to the electronic device, wherein the deletion instruction is configured to delete the reservation information.

In some embodiments, if determining that the difference value between the target reference time and the execution time is less than the values in the preset range, the controlling the electronic device to execute the reservation instruction includes:
  acquiring a working mode of the electronic device;
  determining whether the working mode is matched with the reservation instruction; and
  if the working mode is not matched with the reservation instruction, sending a mode switching instruction and the reservation instruction to the electronic device, wherein the mode switching instruction is configured to instruct the electronic device to switch the working mode to a working mode matched with the reservation instruction.

In some embodiments, after the receiving the reservation instruction sent by the terminal device, the reservation method further includes:
  determine whether the reservation instruction is correct; and
  if determining that the reservation instruction is incorrect, outputting a prompt message, wherein the prompt message is configured to prompt a user to correct and send the reservation instruction.

In some embodiments, in the embodiments of the present disclosure, the reservation apparatus ensures that the execution time indicated by the reservation instruction is reasonable before controlling the electronic device to execute the reservation instruction, thus ensuring normal running of the electronic device.

In some embodiments, the reservation method further includes: if determining that the reservation instruction is correct, saving the reservation instruction in a cache queue.

In some embodiments, the reservation method further includes: if determining that the reservation instruction is correct, saving the reservation instruction to a memory.

In some embodiments, the target reference time is determined according to the current time and network delay.

In some embodiments, the reservation method further includes:
  periodically acquiring the current time from the clock source.

According to a second aspect, a reservation apparatus is provided, wherein the reservation apparatus includes:
  a receiving unit, configured to receive a reservation instruction sent by a terminal device, wherein the reservation instruction carries identification information, an operation content and an execution time of the electronic device;
  a timing unit, configured to obtain a current time from a clock source and start timing, and obtain a target reference time, wherein the clock source is a clock source inside the terminal device, a network device, or the reservation apparatus, and the target reference time is configured to indicate the time after timing; and
  a control unit, configured to, if determining that a difference value between the target reference time and the execution time is less than values in a preset range, control the electronic device to execute the reservation instruction.

In some embodiments, the reservation apparatus further includes a sending unit;
  wherein, the control unit is further configured to: after receiving the reservation instruction sent by the terminal device, determine whether the electronic device stores reservation information; and
  the sending unit is configured to, if determining that the electronic device or the reservation apparatus stores the reservation information, send a deletion instruction to the electronic device, wherein the deletion instruction is configured to delete the reservation information.

In some embodiments, the control unit is specifically configured to:

acquire a working mode of the electronic device; and determine whether the working mode is matched with the reservation instruction; and the sending unit is configured to, if the working mode is not matched with the reservation instruction, send a mode switching instruction and the reservation instruction to the electronic device, wherein the mode switching instruction is configured to instruct the electronic device to switch the working mode to a working mode matched with the reservation instruction.

In some embodiments, the control unit is further configured to:

determine whether the reservation instruction is correct; and if determining that the reservation instruction is incorrect, output a prompt message, wherein the prompt message is configured to prompt a user to correct and send the reservation instruction.

In some embodiments, the reservation apparatus further includes: a storage unit, configured to, if determining that the reservation instruction is correct, save the reservation instruction in a cache queue.

In some embodiments, the storage unit is further configured to, if determining that the reservation instruction is correct, save the reservation instruction to a memory.

In some embodiments, the reservation apparatus further includes an updating unit, configured to:

periodically acquire the current time from the clock source.

According to a third aspect, a reservation apparatus is provided, wherein the reservation apparatus includes:

at least one processor, and a memory communicated with the at least one processor; wherein, the memory stores instructions executable by the at least one processor, and the at least one processor implements the method according to any one of the first aspect by executing the instructions stored in the memory.

According to a fourth aspect, a computer readable medium storing a computer program thereon is provided, wherein the computer program, when executed by a processor, executes the steps of the method according to any one of the first aspect.

DETAILED DESCRIPTION

In order to make the objectives, the technical solutions and the advantages of the present disclosure clearer, the technical solutions in the embodiments of the present disclosure will be described hereinafter in a clear and complete manner in conjunction with the drawings in the embodiments of the present disclosure.

At present, a reservation function of an electronic device is realized by counting down through a timer. This method is mainly realized by the timer of the electronic device. However, if the accuracy of the timer is not high enough, the electronic device may have a large error when reaching scheduled time after long-term operation. For the reservation time, a user needs to calculate a timing duration according to a desired reservation time thereof, so the user experience is poor.

In view of this, an embodiment of the present disclosure provides a reservation method for an electronic device, which is configured to improve reservation accuracy. In the embodiment of the present disclosure, a reservation apparatus controlling the electronic device, when receiving a reservation instruction, can obtain a current time from a clock source, for example, the reservation apparatus can obtain a more accurate time from a network side, and then start timing, and then control the electronic device to execute the reservation instruction at an execution time indicated by the reservation instruction. Since the reservation apparatus obtains the accurate current time from the network side only after receiving the reservation instruction, the synchronization with the network side is ensured as much as possible, and the reservation accuracy is improved.

The following describes the technical solutions provided by the embodiments of the present disclosure with reference to the drawings of the specification.

Figure 1:
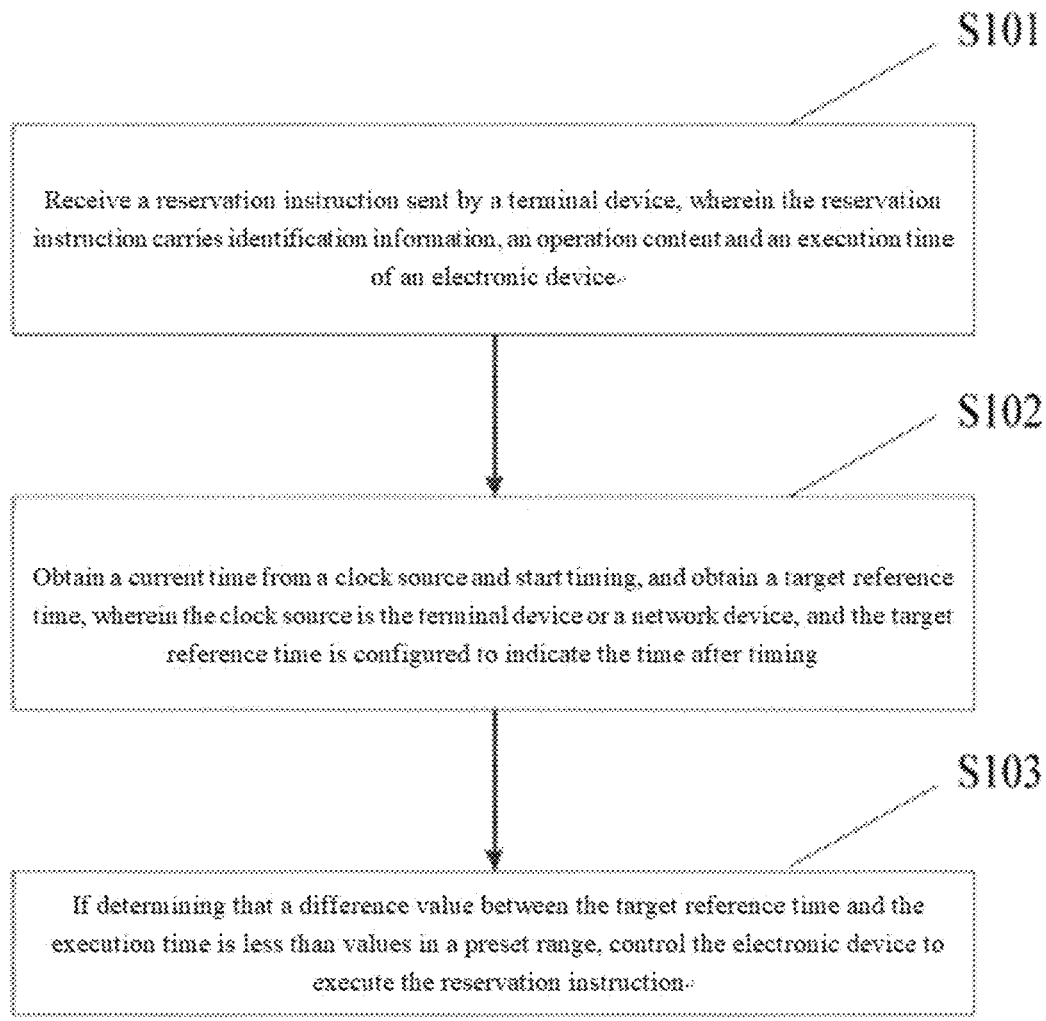
FIG. 1 is a flow chart of a reservation method for an electronic device provided by an embodiment of the present disclosure.

Referring to FIG. 1, an embodiment of the present disclosure provides a reservation method for an electronic device applied to a reservation apparatus, wherein the reservation method includes:

S101: receiving a reservation instruction sent by a terminal device, wherein the reservation instruction carries identification information, an operation content and an execution time of the electronic device:

S102: obtaining a current time from a clock source and starting timing, and obtaining a target reference time, wherein the clock source is a clock source inside the terminal device, a network device, or the reservation apparatus, and the target reference time is configured to indicate the time after timing; and S103: if determining that a difference value between the target reference time and the execution time is less than values in a preset range, controlling the electronic device to execute the reservation instruction.

At present, a reservation function of an electronic device, such as an air conditioner is realized counting down through a remote control. For example, the user ma set the air conditioner to "power on in 4 hours" through the remote control. If a time needing to be reserved by the user is relatively longer than the current time, then the user needs to calculate a timing duration, which is troublesome and causes poor user experience. Furthermore, the reservation function is usually realized according to a timer inside the electronic device, such as a timer of a singlechip in the electronic device. Because the accuracy of the timer may have an error when the single chip runs for a long time, the longer the running time is, the greater the error is. For example, the user may time to "power on in 4 hours", but in fact, the electronic device may power on in 4 hours and 10 minutes.

To this end, an embodiment of the present disclosure provides a reservation apparatus, which may receive a reservation instruction sent by the user through a terminal device. In some cases, there may be a plurality of electronic devices, such as an air conditioner, a rice cooker, a refrigerator, etc. If the user may reserve each electronic device through the terminal device, in order to enable the reservation apparatus after receiving a reservation instruction, to determine which electronic device is controlled by the reservation instruction, the reservation instruction may carry identification information of the electronic device, so that the reservation apparatus can determine which electronic device is controlled by the reservation instruction according to the identification information. Since the electronic device is reserved to realize a certain function, the reservation instruction also carries an execution time and an operation content, and the operation content may be used to indicate an operation to be performed by the electronic device, such as a power-on operation and a power-off operation, or the like.

After the reservation apparatus receives the reservation instruction sent from the terminal device, in step S102, the reservation apparatus may obtain the current time from the clock source, wherein the clock source may be a clock source inside the terminal device itself, or a server on the network side, or an electronic device with an RTC clock circuit, etc., and of course, may also be a clock source inside the reservation apparatus. Generally, a time of the terminal device is synchronized with a base station, which has higher accuracy. Therefore, the current time acquired by the reservation apparatus from the clock source is relatively correct. In the embodiment of this disclosure, considering that there may be network delay when the terminal device or the server on the network side transmits the current time to the reservation apparatus, the reservation apparatus may take the current time acquired from the terminal device or the server on the network side plus the network delay as the actual current time. The network delay may be set according to experience, or measured by actual experiments.

The reservation apparatus in the embodiment of the present disclosure may be independent of the electronic device, or may be set on the electronic device. In a possible embodiment, the reservation apparatus may be a wireless module or a Wireless Fidelity (Wireless Fidelity, WIFI) module. In this case, the reservation apparatus does not need a gateway, and may be directly connected to a router to realize communication with the server on the network side. The reservation apparatus may also be a wireless module using zigbee protocol and Bluetooth technology. In this case, the reservation apparatus is connected to the gateway, and the gateway is then connected to the router, so as to realize communication with the server on the network side. The reservation apparatus may also be a wireless module that can be connected to the base station using technologies such as 4G. In this case, the reservation apparatus is not limited by the router or gateway, and has a wider application range.

After acquiring the current time, the reservation apparatus starts timing. Timing may be carried out by a timer inside the reservation apparatus or by an RTC clock circuit inside the reservation apparatus, so the current time of the reservation apparatus will change in real time. The reservation apparatus may continuously compare the timing time of the reservation apparatus, that is, the target reference time with the execution time, until a difference value between the two is less than values within a preset range, that is, the difference value between the target reference time and the execution time indicated by the reservation instruction is less than the values within the preset range. For example, when the two are the same or the difference value between the two is less than 2 seconds, it is considered that the current time has reached the time when the electronic device executes the reservation instruction. At this time, the reservation apparatus controls the electronic device to execute the reservation instruction. For example, the reservation apparatus may send the execution instruction to the electronic device to realize an operation function indicated by the reservation instruction.

In order to enable the electronic device to run more accurately according to the execution time indicated by the reservation instruction, in the embodiment of the present disclosure, the reservation apparatus may periodically update the current time, that is, after acquiring the current time, the reservation apparatus may periodically obtain the current time from the clock source before sending the execution instruction to the electronic device.

Alternatively, the terminal device may probably send a plurality of reservation instructions to the reservation apparatus, and execution times indicated by the reservation instructions are different either. In this case, after the reservation apparatus sends an execution instructions to the electronic device so that the electronic device realizes the operation functions indicated by the reservation instructions, the reservation apparatus may also periodically request the clock source to acquire the current time.

If the reservation apparatus is independent of the electronic device, while the electronic device itself may be probably reserved to run at a certain time, for example, a remote control of an air conditioner may reserve to turn the air conditioner on or off. In this case, the execution time indicated by the reservation instruction sent by the terminal device may be the same as the time when the electronic device itself is reserved, and there may be conflicts between the reserved operations. For example, at 8:00 in the morning, the remote control reserves to turn on the air conditioner in 4 hours, which means that the air conditioner is always turned off between 8:00 and 12:00. However, the execution time indicated by the reservation instruction sent by the terminal device is 9:00 in the morning, and an operation content is refrigerating, which can be apparently realized only when the air conditioner is turned on. In this case, even if the reservation apparatus sends the execution instruction, the air conditioner is turned off and cannot receive the execution instruction. For another example, the remote control reserves to turn off the air conditioner at 12:00 in the noon, while the terminal device reserves to turn on the air conditioner at 12:00 in the noon. Obviously, the two conflict with each other.

In view of this, in the embodiment of the present disclosure, after receiving the reservation instruction sent by the terminal device, the reservation apparatus may determine whether the electronic device or the reservation apparatus stores the reservation information. The reservation apparatus may send a query request message to the electronic device to request the electronic device to feed back the stored reservation information. Alternatively, the reservation apparatus may check whether the reservation information is stored in the reservation apparatus itself. If the electronic device feeds back to the reservation apparatus that the electronic device does not store the reservation information, or the reservation apparatus itself does not store the reservation information, the reservation apparatus may send an execution instruction to the electronic device at the execution time. However, if the electronic device feeds back to the reservation apparatus that the electronic device stores the reservation information, or the reservation apparatus stores the reservation information, the reservation apparatus may send a deletion instruction to the electronic device to instruct the electronic device to delete the stored reservation information. Alternatively, the reservation apparatus may send a cancellation instruction to the electronic device to instruct the electronic device to cancel the operation indicated by the stored reservation information.

In the embodiment of the present disclosure, if the electronic device or the reservation apparatus itself stores the reservation information, the reservation information may be the previous reservation information. In order to avoid the disorder of the operation of the electronic device caused by the conflict of the reservation information stored in a time domain when the electronic device executes the reservation instruction, the reservation information may be deleted in the embodiment of the present disclosure to ensure the normal operation of the electronic device as much as possible.

After the reservation apparatus determines that the electronic device has deleted the reservation information stored in the electronic device or the reservation apparatus, the reservation instruction may be saved in a cache queue of the reservation apparatus. Prior to this, the reservation apparatus needs to determine whether the reservation instruction is correct. Since the user sends the reservation instruction through the terminal device, typically inputting the execution time, the operation content and the like to the terminal device: due to the negligence of the user, the execution time input by the user may be wrong, which leads to that the electronic device cannot realize the reservation function normally. For example, the current time is 9:00 pm on July $25^{th}$, and the execution time input by the user to the terminal device at the moment is 6:00 pm on July $25^{th}$. Obviously, this execution time is invalid, that is, the reservation instruction is wrong. For another example, a highest temperature of an air conditioner is generally 30° C. If a reservation temperature carried by the reservation instruction input by the user to the terminal device is 36° C., it is obvious that the reservation instruction is also wrong. In order to ensure that the electronic device can normally realize the reservation function, in the embodiment of the present disclosure, the reservation apparatus may determine whether the reservation instruction is correct after receiving the reservation instruction sent by the terminal device, and output a prompt message if it is determined that the reservation instruction is incorrect, wherein the prompt information is configured to prompt the user to correct the input reservation instruction, such as resending the reservation instruction or canceling the reservation instruction, so as to ensure that the reservation instruction is reasonable before the electronic device executes the reservation instruction, thus ensuring the normal operation of the electronic device.

If the reservation apparatus determines that the reservation instruction is correct, the reservation instruction may be saved in the cache queue of the reservation apparatus. There may probably be more than one reservation instruction in the cache queue, which can be stored in the cache queue as long as the reservation apparatus receives the reservation instruction. Since the execution time indicated by the reservation instruction sent by the terminal device may be a specific time point, the user needs only to input a reservation time point at the terminal device without calculating the timing duration, which is more convenient and has better user experience. In some embodiments, if determining that the reservation instruction is correct, the reservation instruction is saved to a memory. In this way, the reservation instruction can be ensured to be not lost due to faults such as power failure in the mid-way.

Further, the reservation function of the terminal device to the electronic device may conflict with operating parameters of the electronic device itself. For example, when the electronic device is in a fault shutdown, the reservation function of the terminal device for the electronic device is to power on. In this case, even if the reservation apparatus sends the power-on instruction to the electronic device, the electronic device cannot execute the power-on instruction either. For another example, the air conditioner needs to set a working mode of the air conditioner to a heating mode when executing an outgoing mode. If the terminal device only reserves the air conditioner to execute the outgoing mode, the air conditioner still cannot normally execute the outgoing mode either.

In view of this, in the embodiment of the present disclosure, when the reservation apparatus controls the electronic device to execute the reservation instruction, the reservation apparatus can acquire the working mode of the electronic device, determine whether the working mode is matched with the reservation instruction, and send a mode switching instruction and the reservation instruction to the electronic device if the working mode is not matched with the reservation instruction, wherein the mode switching instruction is configured to instruct the electronic device to switch the working mode to the working mode matched with the reservation instruction. For example, if the terminal device reserves the air conditioner to execute the outgoing mode, the reservation apparatus sends the air conditioner a reservation instruction for the outgoing mode and the mode switching instruction for switching the air conditioner to the heating mode when controlling the air conditioner to execute the reservation instruction. Alternatively, when the reservation apparatus controls the electronic device to execute the reservation instruction, the reservation apparatus may acquire a state of the electronic device, and send the reservation instruction to the electronic device only when determining that the electronic device is in a normal state, thus ensuring the normal operation of the electronic device.

The following describes the apparatus provided by the embodiments of the present disclosure with reference to the drawings of the specification.

Figure 2:
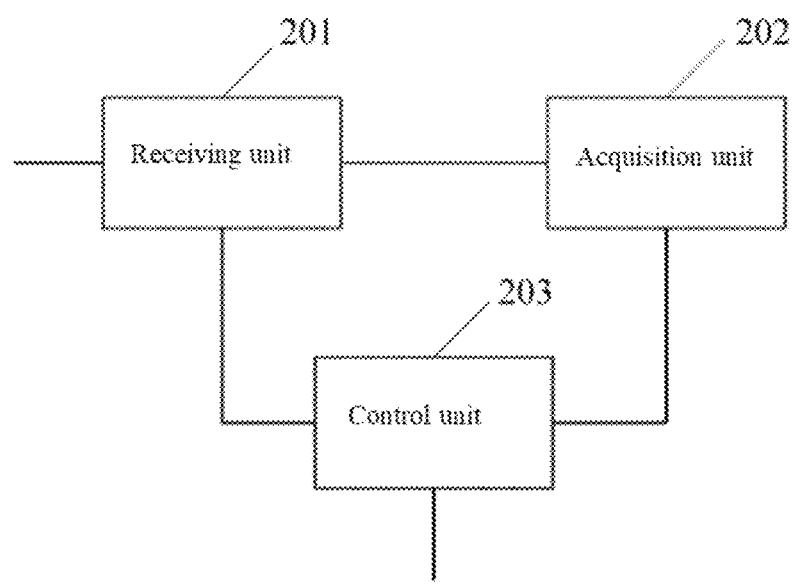
FIG. 2 is a schematic structural diagram of a reservation apparatus provided by some embodiments of the present disclosure.

Referring to FIG. 2, based on the same inventive concept, some embodiments of the present disclosure provide a reservation apparatus, which may be a wireless module and may include: a receiving unit 201, a timing unit 202 and a control unit 203.

The receiving unit 201 is configured to receive a reservation instruction sent by a terminal device, wherein the reservation instruction carries identification information, an operation content and an execution time of the electronic device;

The timing unit 202 is configured to obtain a current time from a clock source and start timing, and obtain a target reference time, wherein the clock source is a clock source inside the terminal device, a network device, or the reservation apparatus, and the target reference time is configured to indicate the time after timing; and the control unit 203 is configured to, if determining that a difference value between the target reference time and the execution time is less than values in a preset range, control the electronic device to execute the reservation instruction.

In some embodiments, the reservation apparatus further includes a sending unit;

wherein, the control unit 203 is further configured to: after receiving the reservation instruction sent by the terminal device, determine whether the electronic device stores reservation information; and the sending unit is configured to, if determining that the electronic device or the reservation apparatus stores the reservation information, send a deletion instruction to the electronic device, wherein the deletion instruction is configured to delete the reservation information.

In some embodiments, the control unit 203 is specifically configured to:
acquire a working mode of the electronic device;
determine whether the working mode is matched with the reservation instruction; and
if the working mode is not matched with the reservation instruction, send a mode switching instruction and the reservation instruction to the electronic device, wherein the mode switching instruction is configured to instruct the electronic device to switch the working mode to a working mode matched with the reservation instruction.

In some embodiments, the control unit 203 is further configured to:
determine whether the reservation instruction is correct; and
if determining that the reservation instruction is incorrect, output a prompt message, wherein the prompt message is configured to prompt a user to correct and send the reservation instruction.

In some embodiments, the reservation apparatus further includes an updating unit, configured to:
periodically acquire the current time from the clock source.

In some embodiments, the reservation apparatus further includes a storage unit, configured to:
if determining that the reservation instruction is correct, save the reservation instruction in a cache queue; or
if determining that the reservation instruction is correct, save the reservation instruction to a memory.

Figure 3:
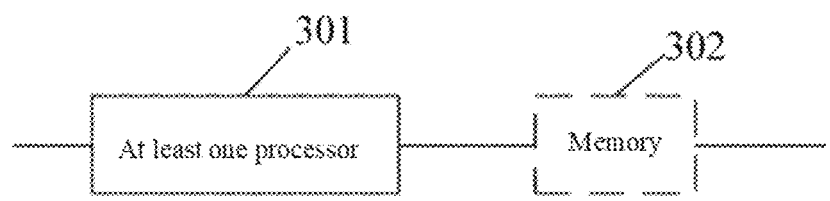
FIG. 3 is a schematic structural diagram of a reservation apparatus provided by some other embodiments of the present disclosure.

Referring to FIG. 3, based on the same inventive concept, some other embodiments of the present disclosure provide a reservation apparatus, which may be a wireless module and may include: at least one processor 301, wherein the processor 301 is configured to implement the steps of the reservation method for an electronic device as shown in FIG. 1 provided by the embodiments of the present disclosure when executing a computer program stored in a memory.

In some embodiments, the processor 301 may specifically be a central processing unit, an Application-Specific Integrated Circuit (Application Specific Integrated Circuit, ASIC), or one or more integrated circuits configured to control program execution.

In some embodiments, the reservation apparatus further includes a memory 302 connected with the at least one processor, and the may 302 may include a Read Only Memory (Read Only Memory, ROM), a Random Access Memory (Random Access Memory, RAM), and a magnetic disc memory. The memory 302 is configured to store data required by the processor 301 when running, that is, instructions that can be executed by the at least one processor 301 are stored in the memory, and the at least one processor 301 executes the instructions stored in the memory 302 to execute the method as shown in FIG. 1. The number of the memory 302 is one or more. The memory 302 is shown in FIG. 3, but it needs to be known that the memory 302 is not a necessary functional module, so it is shown in with dashed lines in FIG. 3.

Physical devices corresponding to the receiving unit 201, the timing unit 202 and the control unit 203 may all be the aforementioned processor 301. The reservation apparatus may be used to execute the method provided by the embodiment as shown in FIG. 1. Therefore, regarding the functions that can be realized by each functional module in the device, please refer to the corresponding description in the embodiment as shown in FIG. 1, which will not be elaborated in detail.

An embodiment of the present disclosure further provides a computer storage medium, wherein the computer storage medium stores computer instructions, and when the computer instructions run on the computer, the computer is caused to execute the method as described in FIG. 1.

It can be clearly understood by those skilled in the art that for the convenience and conciseness of description, only the division of the above-mentioned functional modules is exemplified. In practical application, the above-mentioned function allocation may be completed by different functional modules as required, that is, an internal structure of the apparatus is divided into different functional modules to complete all or part of the above-described functions. The specific working processes of the system, apparatus and unit described above may refer to the corresponding processes in the aforementioned method embodiments, and will not be described in detail here.

In the several embodiments provided in the present disclosure, it should be understood that the disclosed apparatus and method may be implemented in other manners. The apparatus embodiments described above are merely illustrative. For example, the division of the modules or units is only one logical function division. In practice, there may be another division manner. For example, multiple units or components may be combined or integrated into another system, or some features may be ignored or not performed. In addition, the illustrated or discussed mutual coupling or direct coupling or communication connection may be indirect coupling or communication connection through some interfaces, apparatuses or units, and may be in electrical, mechanical or other forms.

The units illustrated as separation parts may either be or not physically separated, and the parts displayed as units may either be or not physical units, i.e., the parts displayed as units may be located in one place or distributed to multiple network units.

Some or all of the units may be selected according to actual needs to achieve the objectives of the solutions in the embodiments.

In addition, each functional unit in each embodiment of the present application may be integrated in one processing unit, or each unit may exist alone physically, or two or more units may be integrated in one unit. The integrated units above may be implemented in the form of hardware, or in the form of software functional units.

The integrated units, if being implemented in the form of a software functional unit and sold or used as an independent product, may also be stored in a computer-readable storage medium. Based on such understanding, the technical solutions of this application can be embodied in the form of software products in essence, or in part contributing to the related arts, or in whole or in part. The computer software product is stored in a storage medium, including a plurality of instructions, which are used for causing a computer device (which may be a personal computer, a server, or a network device) or a processor (processor) to execute all or a part of steps of the method described in all embodiments of this application. The foregoing storage medium includes: any medium that is capable of storing program codes such as a Universal Serial Bus Flash Disk (Universal Serial Bus Flash Disk), a mobile hard disk, a Read-Only Memory (Read-Only Memory, ROM), a Random Access Memory (Random Access Memory, RAM), a magnetic disk or an optical disk, and the like.

Apparently, those skilled in the art can make various modifications and variations to the present disclosure without departing from the spirit and scope of the present disclosure. In this way, if these modifications and variations of the present disclosure are within the scope of the claims of the present disclosure and equivalent technologies thereof, the present disclosure is also intended to include these modifications and variations.

The invention claimed is:

1. A reservation method for an electronic device applied to a reservation apparatus, comprising:
   receiving a reservation instruction sent by a terminal device, wherein the reservation instruction carries identification information, an operation content and an execution time of the electronic device;
   obtaining a current time from a clock source and starting timing, and obtaining a target reference time, wherein the clock source is a clock source inside the terminal device, a network device, the electronic device, or the reservation apparatus, and the target reference time is configured to indicate a time after starting timing; and
   if determining that a difference value between the target reference time and the execution time is less than values in a preset range, controlling the electronic device to execute the reservation instruction.

2. The reservation method according to claim 1, wherein after the receiving the reservation instruction sent by the terminal device, further comprising:
   determining whether the electronic device or the reservation apparatus stores reservation information; and
   if determining that the electronic device stores the reservation information, sending a deletion instruction to the electronic device, wherein the deletion instruction is configured to delete the reservation information.

3. The reservation method according to claim 1, wherein if determining that the difference value between the target reference time and the execution time is less than the values in the preset range, the controlling the electronic device to execute the reservation instruction comprises:
   acquiring a working mode of the electronic device
   determining whether the working mode is matched with the reservation instruction; and
   if the working mode is not matched with the reservation instruction, sending a mode switching instruction and the reservation instruction to the electronic device, wherein the mode switching instruction is configured to instruct the electronic device to switch the working mode to a working mode matched with the reservation instruction.

4. The reservation method according to claim 1, wherein after the receiving the reservation instruction sent by the terminal device, further comprising:
   determining whether the reservation instruction is correct; and
   if determining that the reservation instruction is incorrect, outputting a prompt message, wherein the prompt message is configured to prompt a user to correct and send the reservation instruction.

5. The reservation method according to claim 1, further comprising:
   periodically acquiring the current time from the clock source.

6. The reservation method according to claim 4, further comprising:
   if determining that the reservation instruction is correct, saving the reservation instruction in a cache queue.

7. The reservation method according to claim 6, further comprising:
   if determining that the reservation instruction is correct, saving the reservation instruction to a memory.

8. The reservation method according to claim 1, wherein the target reference time is determined according to the current time and network delay.

9. A reservation apparatus, comprising:
   a receiving unit, configured to receive a reservation instruction sent by a terminal device, wherein the reservation instruction carries identification information, an operation content and an execution time of the electronic device;
   a timing unit, configured to obtain a current time from a clock source and start timing, and obtain a target reference time, wherein the clock source is a clock source inside the terminal device, a network device, the electronic device, or the reservation apparatus, and the target reference time is configured to indicate a time after starting timing; and
   a control unit, configured to, if determining that a difference value between the target reference time and the execution time is less than values in a preset range, control the electronic device to execute the reservation instruction.

10. The reservation apparatus according to claim 9, further comprising a sending unit;
    wherein, the control unit is further configured to: after receiving the reservation instruction sent by the terminal device, determine whether the electronic device or the reservation apparatus stores reservation information; and
    the sending unit is configured to, if determining that the electronic device stores the reservation information, send a deletion instruction to the electronic device, wherein the deletion instruction is configured to delete the reservation information.

11. The reservation apparatus according to claim 10, wherein the control unit is specifically configured to:
    acquire a working mode of the electronic device; and
    determine whether the working mode is matched with the reservation instruction; and
    the sending unit is configured to, if the working mode is not matched with the reservation instruction, send a mode switching instruction and the reservation instruction to the electronic device, wherein the mode switching instruction is configured to instruct the electronic device to switch the working mode to a working mode matched with the reservation instruction.

12. The reservation apparatus according to claim 9, wherein the control unit is further configured to:
    determine whether the reservation instruction is correct; and
    if determining that the reservation instruction is incorrect, output a prompt message, wherein the prompt message is configured to prompt a user to correct and send the reservation instruction.

13. The reservation apparatus according to claim 12, further comprising:
    a storage unit, configured to, if determining that the reservation instruction is correct, save the reservation instruction in a cache queue.

14. The reservation apparatus according to claim 13, wherein the storage unit is further configured to, if determining that the reservation instruction is correct, save the reservation instruction to a memory.

15. The reservation apparatus according to claim 9, further comprising: an updating unit, configured to periodically acquire the current time from the clock source.

16. A reservation apparatus, comprising:
at least one processor, and
a memory communicated with the at least one processor;
wherein, the memory stores instructions executable by the at least one processor, and the at least one processor is configured to:
receive a reservation instruction sent by a terminal device, wherein the reservation instruction carries identification information, an operation content and an execution time of the electronic device;
obtain a current time from a clock source and starting timing, and obtaining a target reference time, wherein the clock source is a clock source inside the terminal device, a network device, the electronic device, or the reservation apparatus, and the target reference time is configured to indicate a time after starting timing; and
if the at least one processor determines that a difference value between the target reference time and the execution time is less than values in a preset range, controlling the electronic device to execute the reservation instruction.

17. A non-transitory computer readable medium storing a computer program thereon, wherein the computer program, when executed by a processor, executes the method according to claim 1.

18. The reservation apparatus of claim 16, wherein the at least one processor is further configured to:
determine whether the electronic device or the reservation apparatus stores reservation information; and
if the at least one processor determines that the electronic device stores the reservation information, send a deletion instruction to the electronic device, wherein the deletion instruction is configured to delete the reservation information.

19. The reservation apparatus of claim 16, wherein the at least one processor is further configured to:
wherein if the at least one processor determines that the difference value between the target reference time and the execution time is less than the values in the preset range, the control the electronic device to execute the reservation instruction comprises:
acquiring a working mode of the electronic device;
determining whether the working mode is matched with the reservation instruction; and
if the working mode is not matched with the reservation instruction, sending a mode switching instruction and the reservation instruction to the electronic device, wherein the mode switching instruction is configured to instruct the electronic device to switch the working mode to a working mode matched with the reservation instruction.

20. The reservation apparatus of claim 16, wherein the at least one processor is further configured to:
wherein after the at least one processor receives the reservation instruction sent by the terminal device, further comprising:
determining whether the reservation instruction is correct; and
if the at least one processor determines that the reservation instruction is incorrect, outputting a prompt message, wherein the prompt message is configured to prompt a user to correct and send the reservation instruction.

* * * * *